United States Patent
Fuller et al.

(10) Patent No.: US 8,145,403 B2
(45) Date of Patent: Mar. 27, 2012

(54) OPERATING A TURBINE AT BASELOAD ON COLD FUEL WITH HOT FUEL COMBUSTION HARDWARE

(75) Inventors: Jason D. Fuller, Simpsonville, SC (US); Garth C. Frederick, Greenville, SC (US); John C. Maters, Liberty, SC (US); Douglas C. Morgan, Moore, SC (US); Luls M. Flamand, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 608 days.

(21) Appl. No.: 12/347,384

(22) Filed: Dec. 31, 2008

(65) Prior Publication Data

US 2010/0168980 A1    Jul. 1, 2010

(51) Int. Cl.
G06F 19/00 (2011.01)
G06G 7/70 (2006.01)

(52) U.S. Cl. ......... 701/100; 701/99; 60/39.281; 60/736; 60/746; 60/773; 60/790

(58) Field of Classification Search ............ 701/99, 701/100; 415/13, 15, 17, 47–50; 60/260, 60/329, 337, 513, 515, 517, 523, 524, 690, 60/734, 736, 772, 39.281, 776, 786, 787, 60/790

See application file for complete search history.

(56) References Cited

U.S. PATENT DOCUMENTS

| | | | |
|---|---|---|---|
| 6,082,092 A | 7/2000 | Vandervort | |
| 6,370,880 B1 * | 4/2002 | Smith et al. | 60/775 |
| 6,874,323 B2 | 4/2005 | Stuttaford | |
| 7,124,591 B2 * | 10/2006 | Baer et al. | 60/786 |
| 7,565,805 B2 * | 7/2009 | Steber et al. | 60/776 |
| 7,571,612 B2 * | 8/2009 | Yoshida et al. | 60/772 |
| 7,854,110 B2 * | 12/2010 | LaGrow et al. | 60/39.281 |
| 2007/0113560 A1 * | 5/2007 | Steber et al. | 60/773 |
| 2009/0060725 A1 * | 3/2009 | Baron et al. | 415/177 |
| 2009/0222187 A1 * | 9/2009 | Martling et al. | 701/100 |

* cited by examiner

*Primary Examiner* — Jack W Keith
*Assistant Examiner* — Rami Khatib
(74) *Attorney, Agent, or Firm* — Dority & Manning, P.A.

(57) ABSTRACT

A method and algorithm are provided to operate a gas turbine at baseload in an emission compliant capable mode to avoid combustion dynamics while operating with cold fuel and hot fuel combustion hardware. The method includes performing a gas turbine operational sequence such as a startup to an emission compliant capable mode. A gas fuel temperature is measured. The gas turbine is operated in the emissions compliant capable mode according to a designated fuel split for avoiding combustion dynamics when a temperature for a gas fuel is below a designated value. A determination is made whether a modified wobbe index for the gas fuel is below an emissions compliant value. An alarm is activated if the modified wobbe index is below the emissions compliant value to notify the operator of a potential emissions shift.

15 Claims, 3 Drawing Sheets

OPERATING A TURBINE AT BASELOAD ON COLD FUEL WITH HOT FUEL COMBUSTION HARDWARE

BACKGROUND OF THE INVENTION

The invention relates generally to gas turbines and more specifically to control of gas turbine operation at baseload under cold fuel conditions.

Industrial-based turbines are often gas-fired and are typically used at power plants to drive generators and produce electrical energy. Combustion dynamics in the combustors of such turbines are defined as pressure pulsations within the combustion system caused by feedback between non-steady heat release and combustion system characteristics. Two such characteristics are chamber acoustics and the fuel delivery system. Combustion dynamics at very high levels can be very destructive and may result in the forced outage of the power plant.

The problem of combustion dynamics is known and is typically controlled to acceptable levels through a number of techniques, including geometric optimization, variation of fuel introduction location and quantity, and fuel properties. With an existing combustor system geometry, splitting the fuel delivery percentages among the various fuel valves introducing fuel into the combustor the problem of combustion dynamics can be abated.

It will be appreciated that there are a number of different types of fuel gases for the combustors of turbines, including natural gas, LPG's such as propane and butane, refinery gases and coal-derived gases. The energy content of each of these fuels varies with its source and, of course, there are variations in energy content among the various types of fuels. The temperature of the fuel gas supplied to the combustor can also be quite different from system to system. For example, many power plants generating electricity from the output of gas turbines provide a fuel gas heater to provide a constant fuel gas temperature to the combustor. Other sites may have a number of boost compressors to elevate the temperature. Thus, different sites provide fuel gas at different temperatures and pressure. Furthermore, sites may source fuel gas from several different vendors or distribution points, which implies that both the temperature and composition of the fuel gas can vary.

The standards for setting fuel gas composition and are defined by a parameter called the Wobbe Index. The modified Wobbe Index allows comparison of the energy content of different fuel gases at different temperatures. Since the gas turbine reacts only to energy released in the combustors and the fuel flow control process is actually a volumetric flow control process, fuels of different composition with relatively close Wobbe Indices can generally be provided in the same fuel control system. The Wobbe Index is defined most generally as the relative fuel heating value divided by the relative density. A modified Wobbe Index is even more instructive because it takes into account the temperature of the fuel. The Modified Wobbe Index is the ratio of the lower heating value to the square root of the product of the specific gravity and the absolute gas temperature.

Variations in the modified Wobbe Index from the specified value for the fuel supplied can lead to unacceptable levels of combustion dynamics. That is, it has been determined that combustion dynamics may be a function of the modified Wobbe Index. Consequently, operation at high levels of variations in the modified Wobbe Index from a specified value can result in hardware distress, reduced component life of the combustion system and a potential for power generation outage.

Further, the performance of a gas turbine in avoiding combustion dynamics is sensitive to the combination of fuel and fuel nozzle for the combustion. When a gas turbine combustor is tuned to avoid combustion dynamics with a specific nozzle geometry and a gas fuel with a modified Wobbe value requiring high gas fuel temperatures for emissions compliant operation at baseload, operation with cold fuel can lead to combustion dynamics and non-compliant emissions. Consequently, a control system may provide interlocks to prevent shifting to an emissions compliant mode capable of achieving baseload, unless fuel temperature and/or the modified Wobbe index exceeds a designated value or range Industrial and power generation gas turbines have such control systems with controllers that monitor and control their operation. These controllers govern the combustion system of the gas turbine, controlling various modes of operation from cold startup through baseload. In addition to operating the gas turbine to prevent combustion dynamics during baseload operation, the controller must maintain gas turbine emissions compliant with government regulations and contractual obligations and at the same time promote efficient power output.

Currently certain gas turbines, such as 7FA+e model gas turbines by General Electric Co., which are designed to run on hot gas fuel, are prevented from operating at an emissions compliant combustion mode when the fuel gas temperature is below a specified range and/or the modified Wobbe index is out of range. This limitation prevents high combustion dynamics, which can lead to hardware damage and/or unit flame out. Typically, power plants heat their fuel using a balance of plant processes, which take a significant amount of time to reach operating temperature. The current forced lockout of emissions compliant mode when fuel temperature is below the specified range means the operator cannot reach higher loads and must hold at a low load level, waiting for fuel temperature to increase. Such delays cost the operator time, extending operation under non-emission compliant modes, and loss of power generation revenues.

Accordingly, there is a need to provide a method to allow operation for gas turbines at baseload in an emission compliant mode when gas fuel temperatures are below a normal range for such operation.

BRIEF DESCRIPTION OF THE INVENTION

The present invention relates to a method, a gas turbine control system, and an algorithm whose technical effect is to permit operation at baseload in an emissions compliant capable mode with a cold temperature for a gas fuel on a unit that has been designed for a modified Wobbe value requiring high gas fuel temperatures.

According to one aspect of the present invention, a method is provided to operate a gas turbine at baseload in an emission compliant mode to avoid combustion dynamics while operating hot fuel combustion hardware using cold gas fuel. The method includes performing a gas turbine operational sequence. The method further includes measuring a gas fuel temperature and operating the gas turbine in an emissions compliant mode according to a designated fuel split for avoiding combustion dynamics in an emission compliant capable mode when a temperature for the gas fuel is below a designated value. The gas fuel is heated to at least the designated value, when possible.

According to another aspect of the present invention, an algorithm is provided whose technical effect is to allow a gas turbine operating in an emission compliant capable mode at baseload to avoid combustion dynamics while operating with cold gas fuel and hot fuel combustion hardware. The algorithm includes disabling interlocks, in a control system for the gas turbine, preventing mode transitions with cold gas fuel from an initial startup mode to an emissions compliant mode at baseload operation. The algorithm also includes scheduling the quaternary fuel to mitigate combustion dynamics in an emission compliant mode based on gas fuel temperature.

According to a further aspect of the present invention, there is provided a gas turbine control system adapted to allow a gas turbine with an emission compliant mode to avoid combustion dynamics while operating with cold fuel and hot fuel combustion hardware. The gas turbine control system includes a gas turbine operational sequence including interlocks adapted to prevent mode transitions, from an initial startup mode to an emission compliant capable mode, while operating with cold gas fuel. A temperature measurement of the gas fuel is provided. An algorithm disables interlocks adapted to prevent mode transitions with cold gas fuel from an initial startup mode to an emissions compliant capable mode of operation. A schedule is also provided for a quaternary fuel split to mitigate combustion dynamics in an emission compliant mode based on gas fuel temperature.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including allowing the gas turbine to proceed to operation in an emissions compliant capable mode all they way to baseload operation with gas fuel temperatures below the specified range. Such operation provides enhanced power output earlier in the startup process for the gas turbine, thereby providing increased revenues for the operator, while at the same time providing the power in accordance with regulatory and contractual emissions requirements. According to the invention, operation with a loss of a fuel heater could also be sustained, allowing the unit to remain online at baseload and in an emissions compliant capable mode when fuel temperature can no longer be maintained. Also, mitigation of combustion dynamics may be provided without use of expensive combustion dynamic probes or modifying system hardware.

Further, the present invention may be combined with other elements of a rapid response program, helping to enable a combined cycle or a simple cycle gas turbine to reach load capable of emissions compliance within ten minutes of pressing a start button.

One aspect of the present invention is a software algorithm that allows operation of gas turbine units in a combustion mode capable of emissions compliance (Mode 6) even though the gas fuel has not yet reached the required temperature. Field data demonstrates the ability to schedule an additional fuel circuit against gas fuel temperature. This fuel schedule mitigates combustion dynamics in Mode 6 when fuel temperature is below specified tolerance, allowing loading of the unit to baseload without waiting on gas fuel to reach its target temperature.

Currently 7FA+e machines designed to run on hot gas fuel are prevented from operating in the emissions compliant combustion mode when the fuel gas temperature is below a specified range. If the machine is operating in the emissions compliant mode and gas fuel temperature drops below hot fuel limits or gas fuel temperature is lost, an automatic gas turbine runback is initiated, lowering load until the gas turbine is below emissions compliant mode.

Figure 1:
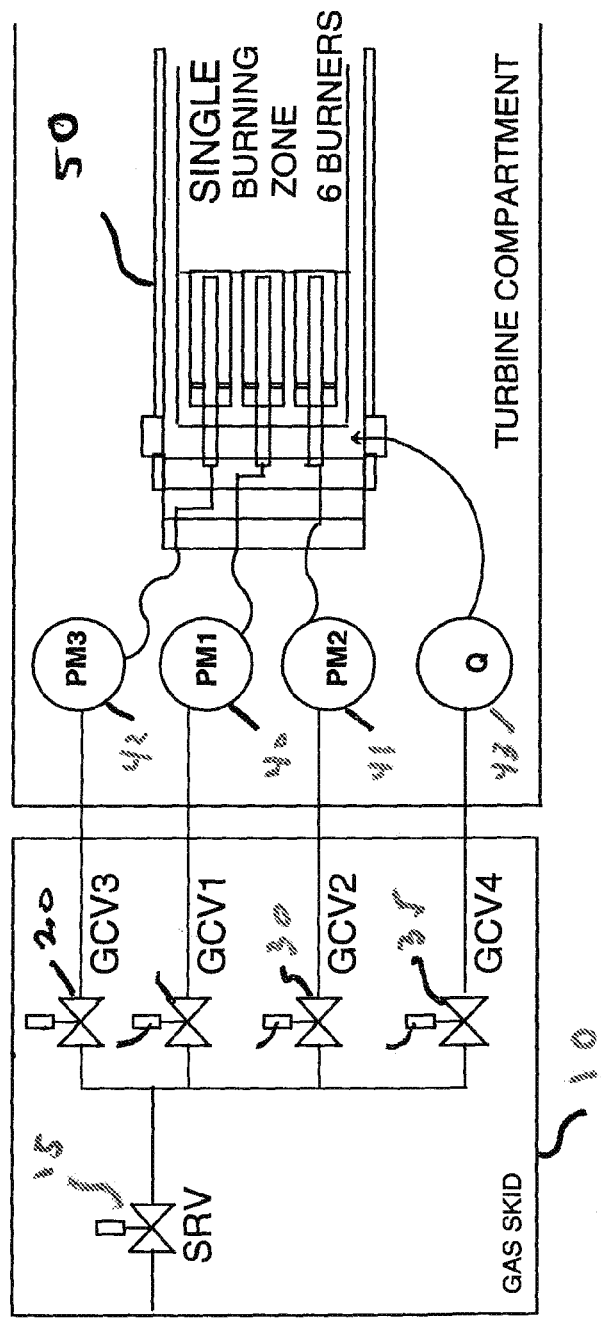
FIG. 1 illustrates a typical fuel split circuit for a high firing gas turbine.
Figure 2:
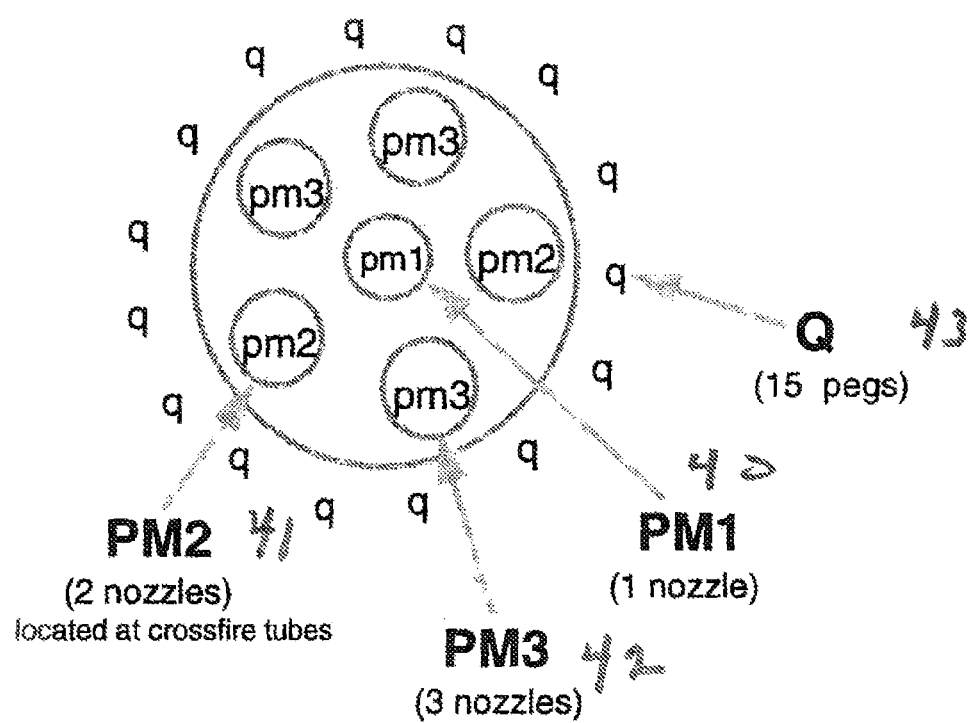
FIG. 2 illustrates a simplified nozzle arrangement for fuel distribution for a typical gas turbine.

These higher firing temperature machines incorporate a single burning zone with a total premix combustor. The load on the unit and the fuel split are controlled by gas fuel staging through four independent gas fuel passages. Control valves are positioned based upon flow characteristics and critical pressure drop across control valves to achieve a desired flow split and load control. FIG. 1 illustrates a typical fuel split circuit for a high firing machine. FIG. 2 illustrates a simplified nozzle arrangement for fuel distribution for a typical high firing machine.

Gas fuel may be supplied from a gas source (not shown) through gas skid 10. Gas skid 10 includes a speed/ratio valve 15 and gas control valve-1 20, gas control valve-2 25, gas control valve-3 30 and gas control valve-4 35. The gas control valves feed premix1 (PM1) nozzle 40. PM2 nozzles 41, PM3 nozzles 42 and quaternary (Q) nozzle 43 of combustor 50. The 6 premix burners PM2, PM2 and PM3 may all be identical in design and effective area. The quaternary nozzle 43 may include 15 pegs located circumferentially around the forward combustion casing distributing fuel through multiple holes in the pegs.

The startup of the gas turbine includes transition through a number of stages associated with increasingly higher load and operating temperatures, as fuel staging is modified. Table I illustrates typical modes of fuel staging.

TABLE I

| MODES OF FUEL STAGING | |
|---|---|
| BURNERS | MODE |
| PM1 | MODE 1 |
| PM2 | MODE 2 |
| PM1 + PM2 | MODE 3 |
| PM1 + PM3 | MODE 4 |
| PM1 + PM2 + PM3 + Q | MODE 6 |

Fuel flow scheduling may include requirements for combustion reference temperature TTRF1 achieving designated values appropriate to the particular fuel scheduling/burner operation. Mode 6 is an emissions compliant mode that requires operation within designated boundaries to ensure that emissions remain compliant with regulatory and contractual limits. Plant control algorithms may also enforce this operation within designated boundaries for combustion reference temperature and other parameters.

Typically power plants heat their fuel using balance of plant processes, which take a significant amount of time to reach operating temperature. The current forced lockout of emissions compliant mode when fuel temp is below target means the customer cannot reach higher loads and must hold at a low load level, waiting on fuel temperature to increase.

The inventive algorithm incorporates operational boundaries for the quaternary fuel split schedule for protection purposes. A maximum and minimum limit of allowable quaternary gas fuel split prevents fuel split from being moved outside desired bounds. Redundant gas fuel temperature sensors may be provided. The controller may use the median value of the gas temperature sensors and notify an operator if one of the sensors drifts beyond a specified limit when compared with the other sensors. An alarm will also alert operators when the gas temperature falls below a predetermined target value plus a specified deadband to alert operator of potential fuel gas heating problem and notify the operator that gas turbine emissions could drift.

A method is provided to operate a gas turbine at baseload in an emission compliant mode to avoid combustion dynamics while operating with cold fuel and hot fuel combustion hardware. The method may be employed while performing a gas turbine operational sequence, such as for example starting up the gas turbine. The startup of the gas turbine may include operating in a series of fuel staging modes from a cold turbine to an emission compliant mode at baseload. The gas turbine operational sequence may incorporate the fuel staging modes as previously described in Table I. The gas turbine may also include measuring a gas fuel temperature. The method may also include operating the gas turbine in an emissions compliant mode according to a designated fuel split for avoiding combustion dynamics in an emission compliant mode when a temperature for a gas fuel is below a designated value.

The method includes providing a designated fuel split for a quaternary nozzle to avoid combustion dynamics during operation in the emissions compliant capable mode at baseload with the gas fuel temperature below the designated value. The fuel split for this operation in the emissions compliant capable mode may further include adjusting the designated fuel split for the quaternary nozzle as a function of gas temperature. Further, the quaternary fuel split will be decreased as gas temperature decreases. More specifically, the quaternary fuel split will be biased from the nominal split setpoint instead of directly scheduled.

Further, the method includes determining if a modified Wobbe index for operation is within tolerance for emissions compliant operation. If the modified wobbe index is not within the tolerance for emission compliant operation, then it is important for the turbine operator to understand that emission may exceed allowed tolerances. The method also includes alarming to inform operator if the modified wobbe index for operation is outside the tolerance for emission compliant operation.

The method may also include an operational sequence for a response to a loss of fuel temperature control. During operation in an emissions compliant capable mode, the gas fuel temperature may drop below the designated fuel gas temperature value for operating in this mode. Such a reduction in temperature could occur, for instance, due to a loss of a gas fuel heater. Prior to the present invention, a reduction in gas fuel temperature outside a lower specification would result in a turbine runback causing a reduction in power until the gas turbine is out of the emissions compliant capable mode 6. Because combustion dynamics may be avoided under the inventive operating method with the reduced fuel temperature as a result of scheduled fuel split, emissions compliant capable mode 6 operation may continue with the reduced gas fuel temperatures or loss of fuel heater control. Therefore, the method includes initiating fuel split schedules for the above-described loss of gas fuel temperature conditions.

The present invention further includes a control system for the gas turbine. The gas turbine control system includes a gas turbine operational sequence including interlocks adapted to prevent mode transitions, from an initial startup mode to an emission compliant capable mode at baseload, while operating with cold gas fuel. The control system further includes an algorithm whose technical effect is to allow a gas turbine operating under an emission compliant capable mode to avoid combustion dynamics while operating with cold gas fuel and hot fuel combustion hardware. The algorithm modifies an existing control system for the 7FA gas turbine control system, which includes interlocks adapted to prevent shifting into modes for which combustion dynamics might result if gas fuel temperature are below designated values. The algorithm disables interlocks, in a control system for the gas turbine, preventing mode transitions with cold gas fuel from an initial startup mode to an emissions compliant capable mode of operation. The inventive algorithm may disable interlocks that preclude shifting into mode 3 or mode 4 (based on particular operating version of the existing control system) with low gas fuel temperature. According to the algorithm, the step of disabling interlocks may include at least one of bypassing a raise inhibit signal to allow loading on cold fuel and bypassing a modified Wobbe index requirement to allow mode 4 fuel transfer with cold fuel.

The combustion loading path of the turbine is different depending on whether operational flexibility startup fuel heating software is installed, therefore this invention has to incorporate software to properly allow the unit to load to baseload for either configuration. If operational flexibility startup fuel heating software is installed, the raise inhibit signal must be bypassed by this invention to allow for loading of the turbine to baseload while on cold fuel. The purpose of the raise inhibit signal for operational flexible startup fuel heating is to prevent the unit from transferring into a mode capable of emissions compliance (Mode 6) until the fuel temperature is such that modified Wobbe index is within 5% of the units designed modified Wobbe index to prevent combustion hardware damage. If the turbine does not have operational flexibility software installed then the modified Wobbe index lockout that prevents operation in Mode 4 or higher must be disabled. The lockout was put in place specifically to prevent combustion hardware damage during high load operation on hot gas fuel nozzle units that did not have the required gas fuel temperature to meet the modified Wobbe index requirements. As this invention allows hot gas fuel nozzle units running cold gas fuel to run to baseload safely without impacting hardware lift, the lockout is no longer required.

The inventive algorithm may also disable the existing interlock preventing transition to an emissions compliant capable mode, when the gas fuel temperature is below the required limit. Further, the algorithm may disable the function causing a turbine runback when operating in the emissions compliant capable mode if the fuel gas temperature drops below a designated value.

To establish conditions that preclude combustion dynamic during operation in the emissions compliant capable mode when fuel gas temperature is below the designated value, the algorithm provides for scheduling quaternary fuel split to mitigate combustion dynamics. The algorithm includes initiating a prefill for the quaternary fuel split upon transferring into the emissions compliant capable mode (Mode 6). Once prefill is completed the fuel split will ramp to the required value based upon measured gas fuel temperature. If gas fuel temperature is at it's required value the fuel split will ramp to a default scheduled value. If the gas fuel temperature is below the required value, the default quaternary fuel schedule will be biases towards a lower split to mitigate combustion dynamics. The shape of the quaternary fuel split bias will be established in field testing.

In addition, the algorithm includes calculating a modified wobbe index for the gas fuel. The algorithm then determines whether the modified wobbe index for the gas fuel is within a predetermined tolerance for emissions compliant operation. According to current combustion requirements, the MWI may be +/−5% of the nominal MWI for the site. The algorithm initiates an alarm function adapted to alert an operator to a modified wobbe index out of range for the emissions compliant capable mode.

Figure 3:
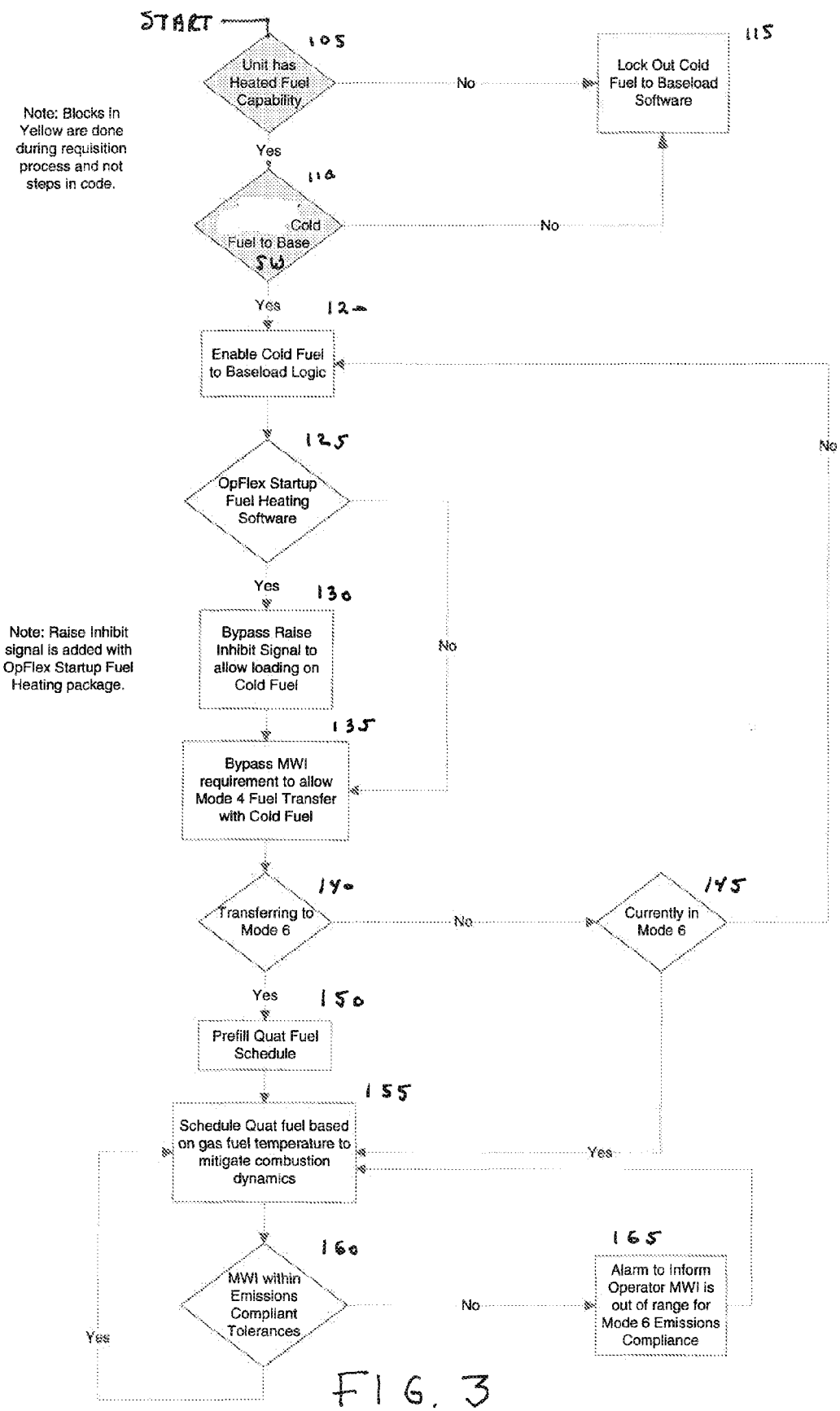
FIG. 3 illustrates a flow chart for an algorithm allowing a gas turbine to proceed to operation in an emissions compliant capable mode all the way to baseload with gas fuel temperatures below the specified range.

FIG. 3 illustrates a flow chart for an algorithm allowing a gas turbine to proceed to operation in an emissions compliant capable mode all the way to baseload with gas fuel temperatures below the specified range. Step 105 determines if the unit has heated fuel capability. Step 110 determines if cold fuel to baseload software is installed. If the unit does not have heated fuel capability then in step 115, cold fuel to baseload software is locked out. If the unit does not have cold fuel to baseload software, then cold fuel to baseload software is locked out in step 115. If heated fuel capability and cold fuel to baseload software is provided, then in step 120 cold fuel to baseload logic is enabled. In step 125, it is determined if operational flexibility startup fuel heating software is provided. If the operational flexibility startup fuel heating software is provided, then a raise inhibit signal to allow loading on cold fuel is bypassed in step 130 and the requirement for control on modified wobbe limit requirements for allowing mode 4 fuel transfer with cold fuel are bypassed in step 135. If the operational flexibility startup fuel heating software is not available as determined in step 125, step 130 is avoided. In step 140 it is determined if a transfer is being initiated to Mode 6. If a transfer is being initiated to Mode 6, then a prefill for a quaternary fuel schedule is performed. If in step 145, the gas turbine is already in Mode 6 so no prefill is required. In step 150, a quaternary fuel schedule is implemented based on gas fuel temperature to mitigate combustion dynamics. The gas fuel temperature is based on redundant fuel temperature sensors. The quaternary gas fuel split is decreased with decreased gas fuel temperature and the fuel split is biased off the nominal split. In step 160, the modified wobbe index of the gas fuel is monitored to confirm that it stays within emission compliant tolerance. If the modified wobbe index of the gas fuel is outside emissions compliant tolerance, then an alarm is provided to inform an operator that the MWI is out of range for Mode 6 emission compliance. The alerted operator may then take corrective action.

While various embodiments are described herein, it will be appreciated from the specification that various combinations of elements, variations or improvements therein may be made, and are within the scope of the invention.

The invention claimed is:

1. A method to operate a gas turbine at high loads in an emission compliant capable mode to avoid combustion dynamics while operating with cold fuel and hot fuel combustion hardware, comprising:
   performing a gas turbine operational sequence;
   measuring a gas fuel temperature;
   operating the gas turbine in an emissions compliant capable mode according to a designated fuel split for avoiding combustion dynamics in an emission compliant capable mode when the temperature for the gas fuel is below a designated value, wherein the designated fuel split includes a designated fuel split for a quaternary nozzle and the designated split for the quaternary nozzle is reduced in response to reduced gas fuel temperature; and
   heating the gas fuel to at least the designated value.

2. The method to operate a gas turbine at high loads in an emission compliant capable mode according to claim 1, further comprising:
   determining if a modified wobbe index for operation is within tolerance for emissions compliant operation.

3. The method to operate a gas turbine at high loads in an emission compliant capable mode according to claim 2, further comprising:
   alarming to inform operator if the modified wobbe index for operation is outside the tolerance for emission compliant operation.

4. The method to operate a gas turbine at high loads in an emission compliant capable mode according to claim 1, wherein the operational sequence is a gas turbine startup.

5. The method configured to allow a gas turbine to operate at high loads in an emission compliant capable mode according to claim 1, wherein the operational sequence is a response to a loss of fuel temperature control.

6. The method configured to allow a gas turbine to operate at high loads in an emission compliant capable mode according to claim 1, wherein the designated split for the quaternary nozzle employs a split bias and curve developed from field data operational experience.

7. An algorithm whose technical effect is to allow a gas turbine operating under an emission compliant capable mode at high loads to avoid combustion dynamics while operating with cold gas fuel and hot fuel combustion hardware, comprising:
   disabling interlocks, in a control system for the gas turbine, preventing mode transitions with cold gas fuel from an initial startup mode to an emissions compliant capable mode at baseload operation;
   scheduling a quaternary fuel split to mitigate combustion dynamics at high loads in an emission compliant capable mode based on gas fuel temperature;
   and reducing the quaternary fuel split as gas fuel temperature is reduced.

8. The algorithm according to claim 7, further comprising:
   calculating a modified wobbe index for the cold gas fuel; and
   determining whether the modified wobbe index for the cold gas fuel is within tolerance for emissions compliant operation.

9. The algorithm according to claim 8, further comprising: initiating an alarm function configured to alert an operator to a modified wobbe index out of range for the emissions compliant mode.

10. The algorithm according to claim 7, the step of scheduling a quaternary fuel split comprising: biasing the quaternary fuel split from the nominal fuel split.

11. The algorithm according to claim 7, the step of disabling interlocks comprising: at least one of bypassing a raise inhibit signal to allow loading on cold fuel and bypassing a modified wobbe index requirement to allow mode 4 fuel transfer with cold fuel.

12. The algorithm according to claim 7, further comprising: initiating a prefill for quaternary fuel schedule prior to shifting to the emissions compliant capable mode.

13. A gas turbine control system configured to allow a gas turbine with an emission compliant capable mode to avoid combustion dynamics while operating with cold fuel and hot fuel combustion hardware, comprising:

a gas turbine operational sequence including interlocks configured to prevent mode transitions, from an initial startup mode to an emission compliant capable mode at baseload, while operating with cold gas fuel;

a gas fuel temperature measurement;

an algorithm whose technical effect is to disable interlocks configured to prevent mode transitions with cold gas fuel from an initial startup mode to an emissions compliant capable mode at baseload operation;

a schedule for a quaternary fuel split to mitigate combustion dynamics at high loads in an emission compliant capable mode based on gas fuel temperature; and wherein the schedule for the quaternary fuel split comprises a decrease in the quaternary fuel split as gas temperature decreases.

14. The gas turbine control system according to claim 13, further comprising:

a calculation of a modified wobbe index for gas turbine;

a determination whether the calculation of the modified wobbe index for the gas turbine falls within emission compliant tolerances; and an alarm configured to alert an operator when the modified wobbe index falls outside emission compliant tolerances to alert them of potential emissions out of compliance.

15. The gas turbine control system according to claim 13, the schedule for the quaternary fuel split further comprising: a designated fuel split schedule bias for the quaternary nozzle as a function of gas fuel temperature.

* * * * *